United States Patent [19]
Cambou

[11] 3,779,480
[45] Dec. 18, 1973

[54] TRANSLATING WINDER FOR ELECTRIC CABLES

[75] Inventor: Andre Paul Cambou, Paris, France

[73] Assignee: Societe Anonyme de Telecommunications, Paris, France

[22] Filed: Jan. 7, 1971

[21] Appl. No.: 104,574

[30] Foreign Application Priority Data
Mar. 19, 1970 France.............................. 7009853

[52] U.S. Cl............................................ 242/158 R
[51] Int. Cl........................................... B65h 57/28
[58] Field of Search...................... 242/158 R, 158.4

[56] References Cited
UNITED STATES PATENTS
| | | | |
|---|---|---|---|
| 3,456,899 | 7/1969 | Smith et al...................... | 242/158 R |
| 2,921,671 | 1/1960 | McMartin..................... | 242/158 R X |
| 3,400,901 | 9/1968 | Parilla et al...................... | 242/158 R |
| 3,257,087 | 6/1966 | Kriete et al. ................ | 242/158.4 R |

FOREIGN PATENTS OR APPLICATIONS
| | | | |
|---|---|---|---|
| 836,411 | 6/1960 | Great Britain................ | 242/158.4 R |
| 836,412 | 6/1960 | Great Britain................ | 242/156.4 R |
| 1,126,871 | 7/1955 | France............................ | 242/158 R |

Primary Examiner—Stanley N. Gilreath
Assistant Examiner—Milton S. Gerstein
Attorney—Marn & Jangarathis

[57] ABSTRACT

Apparatus for automatically winding cable onto a rotating spool is disclosed in accordance with the teachings of the present invention wherein said rotating spool is mounted on a moveable carriage, the lateral movement of which is controlled as a function of the displacement of the cable as said cable is wound on said spool. As adjoining turns of cable are formed, the angle formed by the intersection of said cable with said spool is varied. The speed and direction of the lateral movement of the moveable carriage is determined by said angle such that said lateral movement opposes the displacement of said cable to urge said angle to a null value. An electric motor is supplied with energy having controllable magnitude and phase for driving the moveable carriage.

2 Claims, 4 Drawing Figures

INVENTOR.
Andre Paul Cambou

BY
Marn & Jangarathis
ATTORNEYS

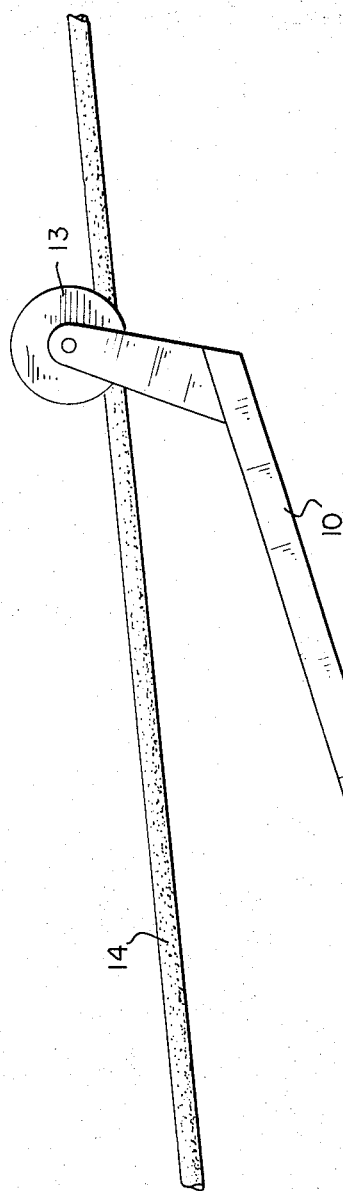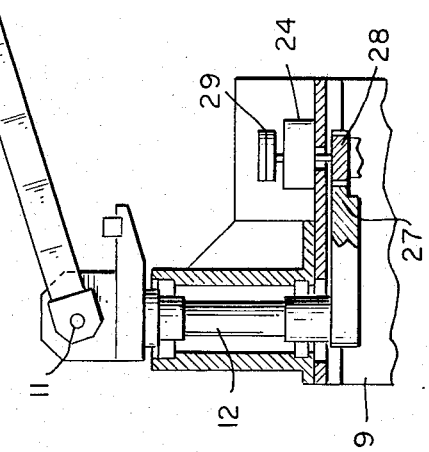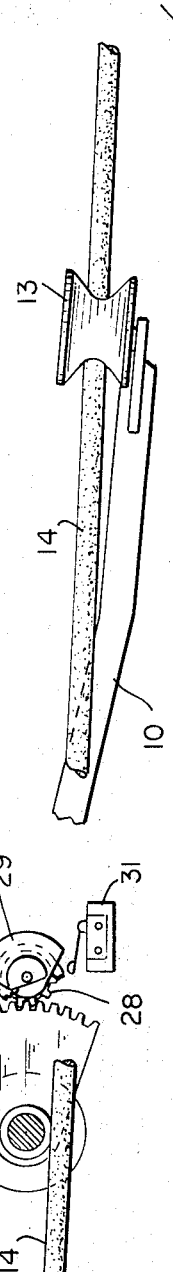
FIG. 3A
FIG. 3B

TRANSLATING WINDER FOR ELECTRIC CABLES

This invention relates to cable winding apparatus and more particularly, to apparatus for automatically winding cable onto a translatable rotating spool.

During the course of manufacturing electric cables, in particular telecommunication cables, the cables must be wound on receiving spools from which they may be utilized in carrying out different operations. It is necessary that these cables be wound in spires or coils having touching edges, in various layers, without the spires or coils in a given layer overlapping each other. The mechanical operation consists of arranging the spires or coils on a spool in helical configuration and is called "splitting". This operation requires great precision and it is often necessary to guide the spires or coils that are being wound with the help of a workman standing close to the rotating spool. If the receiving spool occupies a fixed position, the angle that the supplied cable makes with the spool varies and, for certain values of this angle, the spire or coil that is being wound has a tendency to position itself on the neighboring spire or coil and not adjacent thereto.

In order to eliminate this disadvantage, translation winders are used which move the spool laterally with respect to the axis of the cable and in which the end of the cable that is wound onto the spool always remains substantially perpendicular to the axis of the spool. These winders are generally equipped with devices that control the movement of the spool after each turn thereof whereby a coil is formed and which also control the movement of adjustable thrust blocks which determine when the direction of translation of the spool is to be reversed. In this system, it is necessary to regulate this movement of the spool, or "no-splitting," for the particular diameter of each cable utilized, and it is also necessary to regulate the thrust blocks at the end of the lateral translation for each type of spool. Those skilled in the prior art will recognize that such operation is sensitive to disturbances, requires great precision, and often necessitates manual adjustment and corrections to rearrange the coils during winding of the cable.

Therefore, it is an object of the present invention to provide a translation winder without the requirement of a "splitting" adjustment, in which the movements and reversals of the spool are accomplished automatically, independent of the spool size.

It is another object of this invention to provide apparatus for automatically winding cable onto a rotating spool wherein said spool is laterally translated in accordance with the formation of each adjacent turn of cable thereon.

It is a further object of the present invention to provide control means for controlling the lateral translation of a rotating spool in accordance with the angular displacement of cable being wound thereon.

It is yet another object of this invention to provide apparatus for sensing the lateral displacement of cable being wound on a rotating spool and to move said rotating spool in a direction and at a rate opposite to said lateral displacement.

Still another object of this invention is to provide apparatus for uniformly winding cable onto a rotating spool in a first lateral direction to form a helix and in a second lateral direction to form an overlying helix wherein the angle formed by the intersection of said cable with said spool admits of minimal deviation.

Various other objects and advantages of the invention will become clear from the following detailed description of an exemplary embodiment thereof, and the novel features will be particularly pointed out in connection with the appended claims.

In accordance with this invention, the cable that is automatically wound on a rotating spool is effective to activate the movement of the spool-carrier carriage upon which the spool is mounted with the aid of a control device that comprises follower means such as an elongated member having guide means affixed thereto, which guide means is adapted to automatically center itself on the cable that is being wound. The follower means operates on variable resistance means which is adapted to control the rotation speed of a motor which in turn drives the carriage. Said follower means also operates on reversible switching means for reversing the phase of the motor current and as a consequence, the movement of the carriage, when a coil of said cable approaches a flange of the spool.

The invention will be more clearly understood by reference to the following detailed description of an exemplary embodiment thereof in conjunction with the accompanying drawings in which:

FIGS. 3A and 3B illustrate the mechanical cooperation between elements of the winding apparatus of the present invention.

Figure 1:
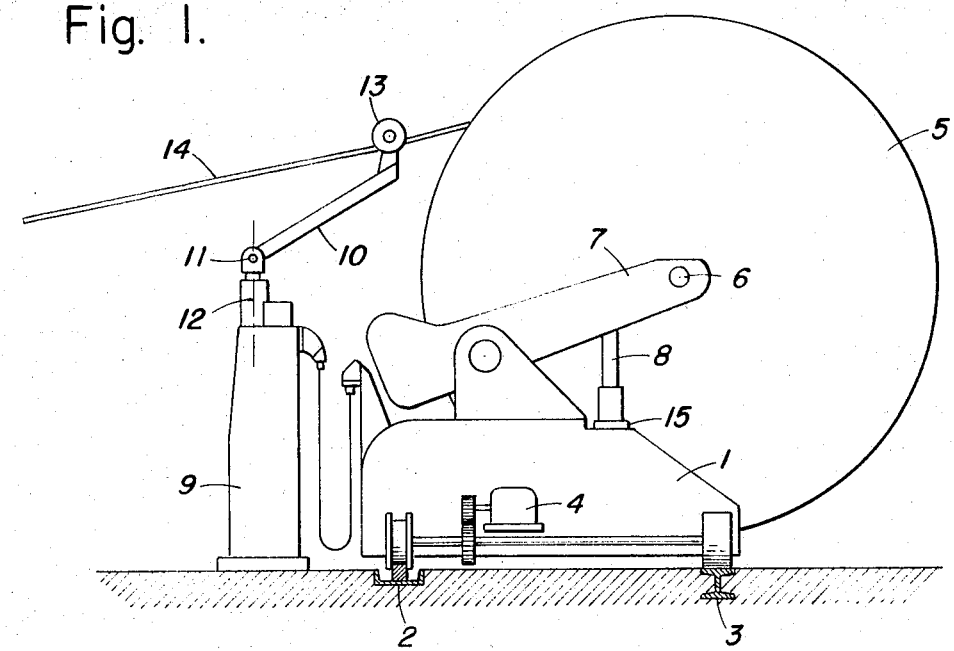
FIG. 1 is a side view of the winding apparatus of the present invention.

Referring now to the drawings wherein like reference numerals are used throughout, and in particular to FIG. 1, there is illustrated carriage 1 which can be moved transversely as by riding on a rail 2 and an iron bit in an I shape 3 attached to the ground. For this movement, the traveling wheels of the carriage are driven in a rotating fashion by an electric motor 4, supplied with energy that is controlled by the apparatus represented in FIG. 2. It is understood that other conventional means, such as a drive chain or conveyor, may be utilized to direct the transverse movement of carriage 1. Spool 5 on which the cable is wound is mounted on a shaft 6 which is axially disposed on the spool. The spool 5 includes a flange at each end thereof. The shaft 6 is driven in a rotating fashion by conventional means that is not illustrated herein. Shaft 6 is supported by two arms 7 which are adapted to ascend or descend under the control hydraulic screw 8 such that the spool mounted on shaft 6 may be loaded or unloaded. Thrust blocks 15 assure mechanical bolting of the spool 6 when said spool obtains an elevated position. A support 9 is attached to a reference support such as the floor of a building or the ground to which is secured follower means 10 which, in turn, is supported by means of guide means 13 on the cable end 14 that is wound on the spool. The guide means 13 is affixed to follower means 10 and may include a grooved roller such that the guide means is symmetrically positioned with respect to the axis of cable 14. Follower means 10, which may comprise an elongated member, is adapted to turn about a pivot axis 12 and ascend or descend on joint 11, the latter being orthogonal with pivot axis 12. The groove of roller 13 is in the form of a V whereby the roller is automatically centered in the axis of the cable. The movement of the follower means in the horizontal direction or in the vertical direction is determined by the corresponding movement of the cable 14 as the cable is wound onto spool 6, and on which the guide means 13 is supported. The mechanism that controls the rotational movement of spool 5 by imparting a rotational velocity to shaft 6 has not been illustrated. This mechanism assures a constant winding tension adjusted to the characteristics of the cable and is not, per se, a part of the present invention.

Figure 2:
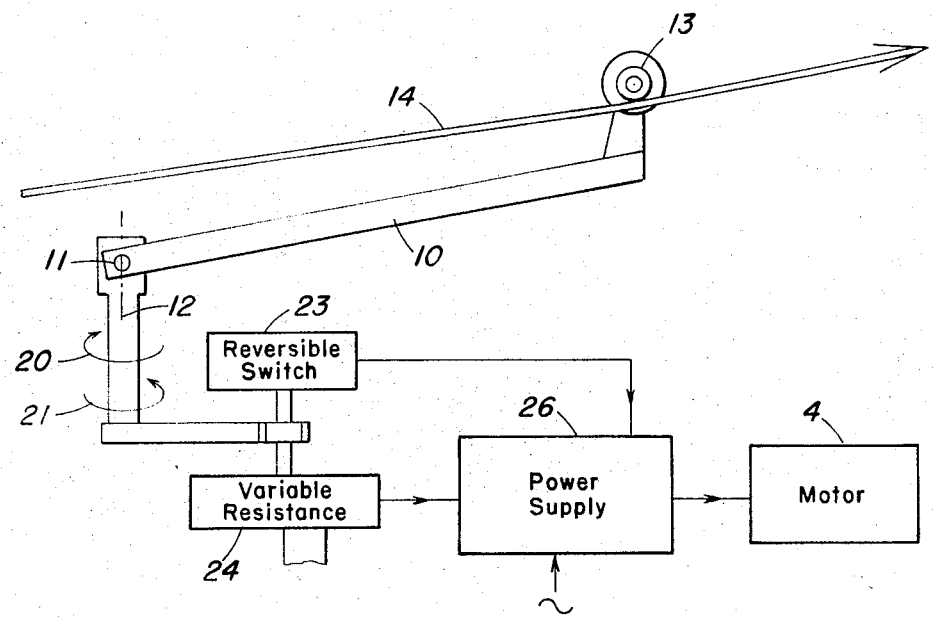
FIG. 2 is an electrical block diagram of the control means in accordance with the invention.

FIG. 2 is a block diagram of the control means of the present invention and comprises follower means 10, reversible switching means 23, variable resistance means 24, a source of energy 26 and electric motor 4. The follower means 10 has been described above and is illustrated as an elongated member secured at pivot axis 12 and adapted to be angularly displaced thereabout. The guide means 13 affixed to follower means 10 is supported by cable 14. It is apparent that when cable 14 is wound onto the rotating spool 5, a helix is formed thereby and the cable 14 is laterally displaced in a first direction. When the last coil of the helix is formed on the spool 5, the cable 14 is laterally displaced in a second direction, reversed from the aforementioned first direction, and an overlying helix is formed thereby. The lateral displacements of cable 14 are transmitted to follower means 10 by the supported guide means 13 so that follower means 10 pivots about axis 12 in the directions indicated at 20 and 21.

Reversible switching means 23 and variable resistance means 24 are mechanically coupled to follower means 10 such as by a pulley system, a bell crank lever, drive gears, or the like. An exemplary embodiment of the mechanical linkage that may be used to couple reversible switching means 23 and variable resistance means 24 to follower means 10 is illustrated in FIGS. 3A and 3B, described below. Reversible switching means 23 is additionally coupled to the source of energy 26 and is adapted to selectively supply the electric motor 4 with energy admitting of a first or second phase. Hence, reversible switching means 23 may comprise a rotatable double pole double throw switch having two pairs of stationary contacts, each pair being coupled to the source of energy 26, and a rotating pair of contacts connected to the electric motor 4. When follower means 10 pivots about axis 12 in the direction 20, the rotatable pair of contacts of reversible switching means 23 may come into contact with a first pair of stationary contacts whereby the electric motor 4 is supplied with energy of a first phase from the source of energy 26. Conversely, when follower means 10 pivots about axis 12 in the direction 21, the rotatable pair of contacts of reversible switching means 23 may come into contact with the second pair of stationary contacts whereby electric motor 4 is supplied with energy of a reversed phase from the source of energy 26. Reversible switching means 23 is well known in the prior art and need not be described in more detail herein. It is understood that other multi-state switching devices may be used to perform the function described above.

Variable resistance means 24 is adapted to vary the magnitude of the energy supplied to electric motor 4 by the source of energy 26. Hence, variable resistance means 24 may comprise a potentiometer or rheostat having an adjustable contact and connected in series with electric motor 4. As follower means 10 pivots about pivot axis 12, the position of the adjustable contact of variable resistance means 24 is altered to thereby change the effective resistance connected in series with electric motor 4. Thus, if the electric motor 4 is a d.c. motor, and the source of energy 26 comprises a d.c. supply, the current supplied to electric motor 4 is varied in accordance with the resistance of variable resistance means 24. It is recognized that the foregoing is applicable if electric motor 4 is an a.c. motor and the source of energy 26 comprises an a.c. supply.

Before describing the operation of the apparatus of FIG. 2, reference is made to FIGS. 3A and 3B which illustrate one embodiment of mechanical linkage used to couple follower means 10 to variable resistance means 24. The pivot axis 12 about which follower means 10 is adapted to turn, comprises a shaft having the lower portion thereof secured to a toothed member 27. The toothed member 27 may comprise a sector of a mechanical gear which rotates in synchronism with the rotation of follower means 10 and is in meshing engagement with pinion 28. The pinion is coupled, as by a shaft, to variable resistance means 24. If the variable resistance means comprises a potentiometer, for example, the adjustable contact, or wiper arm, thereof may be rotatable about the axis of rotation of pinion 28. Hence, a rotation of pinion 28, as by the rotation of member 27, is communicated to the wiper arm of the potentiometer. It may, therefore, be appreciated that the rotation of follower means 10 in the direction 20 or 21 results in a corresponding rotation of the wiper arm to effect an adjustment in the resistance of the potentiometer. Additionally, cam 29 is coupled to the shaft common to pinion 28 and variable resistance means 24 and is adapted to rotate in synchronism with the pinion. Cam 29 is here illustrated as having a single lobed portion disposed such that rotation of the cam in a first direction places the lobed portion thereof in intimate contact with a movable contact of switch means 30 and rotation of the cam in a second direction places the lobed portion thereof in intimate contact with a movable contact of switch means 31. Cam 29 may be provided with a plurality of lobed portions to accomplish the foregoing. Each of switch means 30 and 31 may comprise a conventional microswitch whereby cam 29 tends to urge the contacts thereof into a closed position to complete an electrical circuit. Alternatively, the rotation of cam 29 may be adapted to urge the contacts into an opened position. Switch means 30 and 31 cooperate to form reversible switch means 23, aforedescribed. Although not illustrated herein, various adjustments may be made between the potentiometer and cam such that the contacts of the switch means are not closed until a desired change in the resistance of the potentiometer is obtained as a result of the rotation of follower means 10.

The operation of the apparatus of FIG. 2 will now be described in conjunction with FIG. 1. At the start, the spool 5 is made to rotate and the cable 14 is wound close to a flange of the spool. The angle formed by the intersection of the cable 14 with the spool 5 is substantially equal to 90°. At this moment, the angular displacement of the follower means 10 about the pivot axis 12 is essentially zero, the reversible switching means 23 maintains a quiescent state and is not activated, the resistance of variable resistance means 24 assumes a quiescent value, the motor 4 is not energized and the carriage 1 is stationary. After the formation of the first spire or coil, the following spire or coil causes the cable 14 to be laterally displaced thereby pivoting the follower means 10. The rotatable pair of contacts of reversible switching means 23 contacts the first pair of stationary contacts to supply electric motor 4 with energy of a first phase, the variable resistance means 24 determines the motor speed and the carriage 1 is moved to the extent that the angular displacement of the follower means 10 is returned to " zero". Alternatively, cam 29 may rotate to close switch means 30, for example. When a roll of cable has been terminated so that a helix has been formed, the cable 14 is constrained by the opposite flange of the spool 5, the angular displacement of follower means 10 is maintained at "zero" and lateral movement of the carriage 1 ceases. Since the cable 14 continues to be wound, another spire or coil forms above the first row or helix and remains constrained by the opposite flange of the spool 5, and there is no lateral translation of the carriage 1. The following spire or coil is formed adjoining the last mentioned spire or coil causing the follower means 10 to be angularly displaced in an opposite direction to that described hereinabove. Angular displacement of the follower means 10 in this opposite direction causes the rotatable pair of contacts of reversible switching means 23 to contact the second pair of stationary contacts whereby electric motor 4 is supplied with energy of a reversed phase. Alternatively, cam 29 may rotate to close switch means 31, for example. Hence, the carriage 1 is translated in a direction such that the angular displacement of follower means 10 is urged toward zero. The foregoing is repeated and cable 14 is wound on spool 5 to form an overlying helix.

It should be clear from the foregoing that the angular displacement of follower means 10 is proportional to the diameter of cable 14. Consequently, the effective value of the resistance of variable resistance means 24 and, therefore, the speed of rotational electric motor 4 is determined by the diameter of cable 14.

While the invention has been shown and described with reference to a specific embodiment thereof, it will be obvious to those skilled in the art that the invention is not solely limited thereto. For example, although the pivot axis 12 is illustrated as being disposed in a direction normal to shaft 6, the pivot axis 12 may assume any disposition about which follower means 10 may pivot in accordance with the lateral displacement of cable 14. In addition, follower means 10 is not limited to an elongated member but may comprise equivalent means to sense the lateral displacement of cable 14 as the cable 14 is wound onto spool 5. Further, reversible switching means 23 may comprise an electronic switch, phase shifter or inverter means adapted to control the direction of rotation of electric motor 4 in accordance with the direction of the lateral displacement of cable 14. Alternatively, reversible switching means 23 may be replaced by a clutch and appropriate drive gears adapted to mechanically couple motor 4 to carriage 1. And variable resistance means 24 may comprise voltage control means or the like, braking means, or clutch means whereby the speed of motor 4 is controlled.

The foregoing and various other changes and modifications in form and details may be made without departing from the spirit and scope of the invention. It is, therefore, intended that the appended claims be interpreted as including all such changes and modifications.

What is claimed is:

1. Apparatus for automatically winding cable onto a rotating spool whereby said cable is wound in helical configuration, comprising:

a translatable carriage on which said rotating spool is mounted;
   an electric motor for driving said translatable carriage, said electric motor having an angular velocity that is a function of the magnitude and phase of electric current supplied thereto;
   a single follower arm positioned at a fixed location proximate said rotating spool and pivotable at one end thereof about two orthogonal axes, one of said axes being disposed in a direction normal to the axis of rotation of said rotating spool and the other of said axes being disposed in a direction parallel to the axis of rotation of said rotating spool;
   a roller affixed to said single follower arm at the other end thereof and supported by said cable at a position upstream of said rotating spool as said cable is wound onto said rotating spool such that said roller and follower arm are angularly displaced about the pivot axis disposed normal to said axis of rotation of said rotating spool in accordance with the angle formed by the intersection of said cable with said rotating spool;
   reversible switching means mechanically coupled to said single follower arm and admitting of first, second and quiescent states, respectively, dependent upon the direction of angular displacement of said follower arm about said pivot axis disposed normal to said axis of rotation of said rotating spool for controlling the phase of the electric current supplied to said electric motor; said reversible switching means assuming its first state when said follower arm pivots in a first direction to supply said electric motor with electric current of a first phase to thereby drive said translatable carriage in a first direction, said reversible switching means assuming its second state when said follower arm pivots in a second direction to supply said electric motor with electric current of a second phase to thereby drive said translatable carriage in a second direction and said reversible switching means assuming its quiescent state when said cable intersects said rotating spool at a substantially normal angle to interrupt the supply of electric current to said electric motor to thereby maintain said translatable carriage at a stationary position; and
   variable resistance means mechanically coupled to said single follower arm and exhibiting a continuously variable resistance value dependent upon the magnitude of angular displacement of said follower arm about said pivot axis disposed normal to said axis of rotation of said rotating spool for continuously controlling the magnitude of electric current supplied to said electric motor in accordance with said resistance value such that the angular velocity of said electric motor is continuously variable as a function of said resistance value.

2. Automatic cable winding apparatus including a rotating spool upon which cable is uniformly wound in a first lateral direction to form a helix and in a second lateral direction to form an overlying helix, comprising:

a movable carriage upon which said rotating spool is mounted, said movable carriage being adapted for bi-directional lateral movement;
   a single elongated member having a first end secured at two orthogonal pivot axes, a first of said axes being disposed in a direction normal to the axis of rotation of said rotating spool and the second of said axes being disposed in a direction parallel to the axis of rotation of said rotating spool, and a second end supported by said cable at a position upstream of said rotating spool, said elongated member being adapted for angular displacement about said first pivot axis in accordance with the translation of said cable as said helix and said overlying helix are formed;

an electric motor for driving said movable carriage;

variable resistance means connected to said electric motor and mechanically coupled to said single elongated member for varying the rotational speed of said electric motor in direct proportion to the angular displacement of said elongated member; and phase reversal switching means connected to said electric motor and mechanically coupled to said single elongated member for determining the direction of rotation of said electric motor in accordance with the angular displacement of said elongated member, whereby said electric motor rotates in a first direction when said helix is formed and in a second direction when said overlying helix is formed.

* * * * *

UNITED STATES PATENT OFFICE
CERTIFICATE OF CORRECTION

Patent No. 3,779,480     Dated December 18, 1973

Inventor(s) Andre Paul Cambou

It is certified that error appears in the above-identified patent and that said Letters Patent are hereby corrected as shown below:

IN THE CLAIMS

Claim 1, Column 6, at line 11 through 13, delete

> and the other of said axes being disposed in a direction parallel to the axis of rotation of said rotating spool, and insert therefore > [such that the other end of said single follower arm is movable in a first direction parallel to a horizontal plane and in a second direction normal to the axis of rotation of said rotating spool;]

Claim 2, at Column 6, line 68 through Column 7, line 1, delete

> and the second of said axes being disposed in a direction parallel to the axis of rotation of said rotating spool, and at Column 7, line 8, insert immediately before the semicolon (;)

> [such that said second end is movable in a first direction parallel to a horizontal plane and in a second direction normal to the axis of rotation of said rotating spool].

Signed and sealed this 9th day of April 1974.

(SEAL)
Attest:

EDWARD M. FLETCHER, JR.
Attesting Officer

C. MARSHALL DANN
Commissioner of Patents